Dec. 8, 1953  N. NELSSON  2,661,515
RESILIENT FASTENING CLIP
Filed May 11, 1948  3 Sheets-Sheet 1

INVENTOR:
Nels Nelsson
BY
Thiess, Olson, & Mecklenburger
Attys

Dec. 8, 1953     N. NELSSON     2,661,515
RESILIENT FASTENING CLIP
Filed May 11, 1948     3 Sheets-Sheet 2
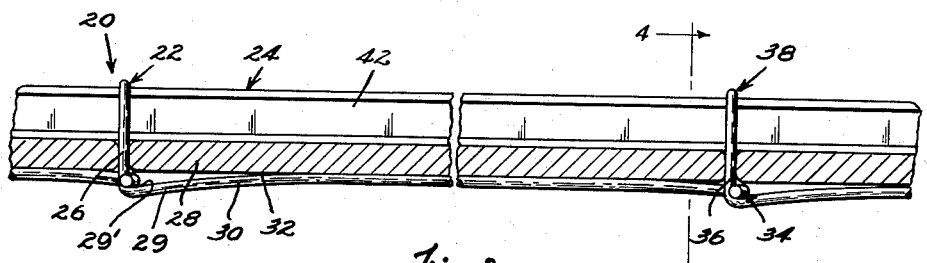
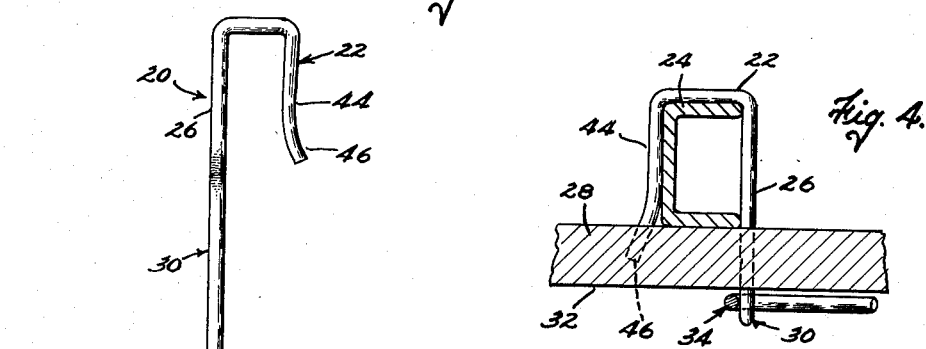
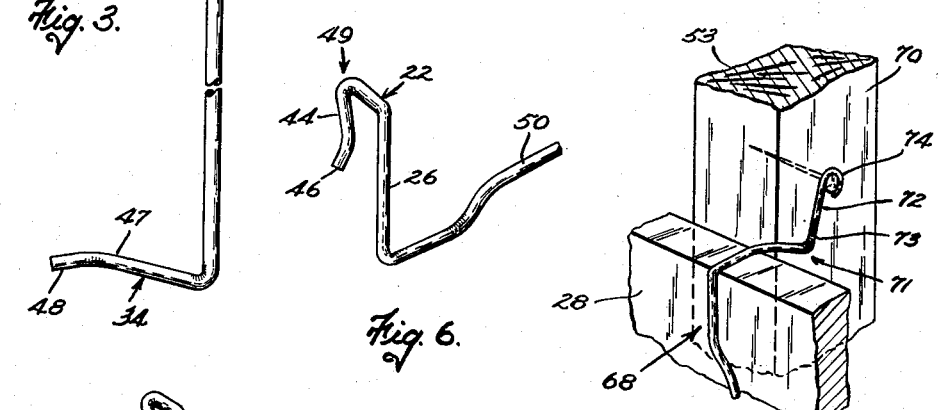
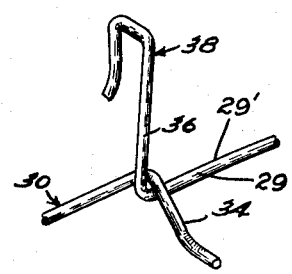
INVENTOR;
Nils Nelsson
BY
Thiess, Olson, & Mecklenburger
Attys

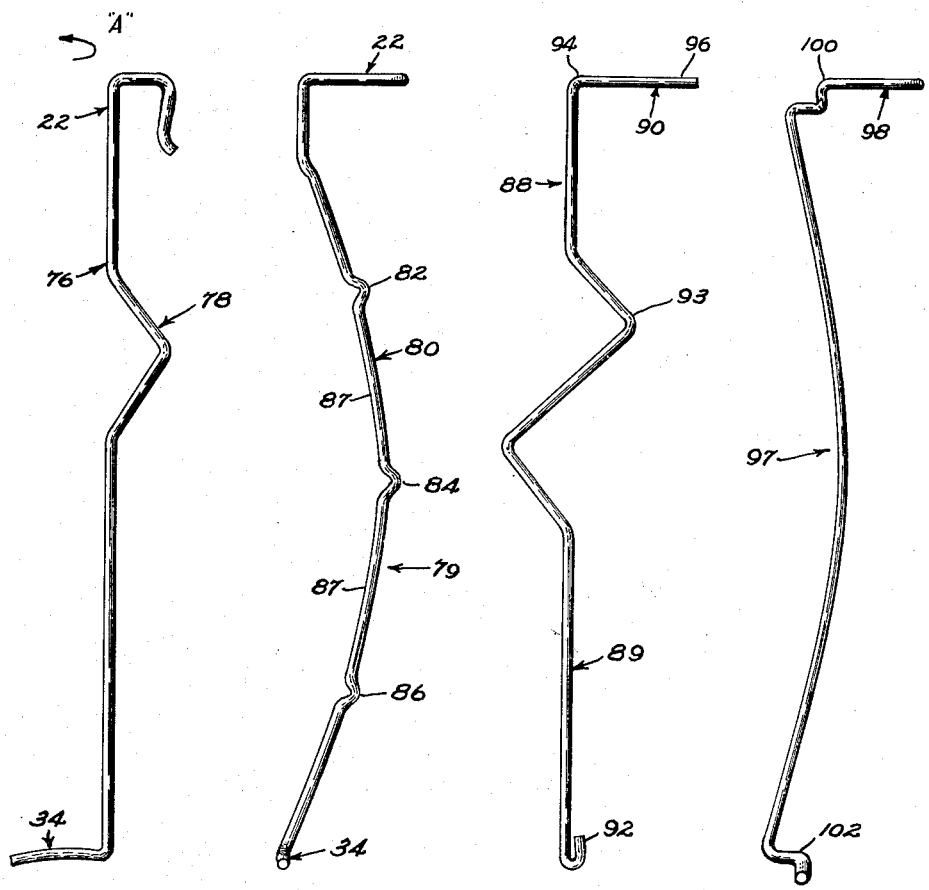

Patented Dec. 8, 1953

2,661,515

UNITED STATES PATENT OFFICE 2,661,515

RESILIENT FASTENING CLIP

Nels Nelsson, Chicago, Ill., assignor to United States Gypsum Company, Chicago, Ill., a corporation of Illinois Application May 11, 1948, Serial No. 26,393

2 Claims. (Cl. 24—261)

This invention relates to ceiling and wall constructions and more particularly to a clip method of anchoring lath panels and the like to supporting members.

Effectively anchoring lath panels to supporting members and at the same time providing sufficient bonding between the panel and the wet coat of plaster applied thereto—particularly in ceiling construction—has always been a difficult, costly and laborious task. The dead weight of the panel plus the weight of the wet plaster applied thereto necessitates an anchoring device to be used which possesses two important qualities, namely; first, sufficient strength and holding power to support the combined weights of the panel and the plaster, and secondly, to provide greater bonding between the panel and the plaster so as to prevent the plaster from subsequently breaking away from the face of the panel, due to its own weight.

Various methods of anchoring lath panels to supporting members, such as by nailing or screwing the panels in place or clamping the edge of the panel to said members, are greatly wanting in the second important quality mentioned above. Another disadvantage of the method of anchoring panels by nails or screws is the inability of the wall or ceiling to yield with the slight movement of the supporting members caused by settling or severe temperature changes. Also, readily dismantling a wall or ceiling constructed in this manner becomes almost an impossibility. In the other method mentioned, namely, clamping the edge of the panel to the supporting members, it is not infrequent to have bulging or sagging result at the portion of the panel intermediate the edges, due to the dead weight of the plaster applied thereto.

Thus, it is one of the objects of this invention to provide an anchoring device which has sufficient strength and holding power to withstand the combined weights of the panel and the plaster and which also serves to increase the bonding between the panel and the plaster.

It is a further object of this invention to provide an anchoring device which will enable the wall or ceiling to yield more readily to the slight movement of the supporting members and thereby greatly minimize the formation of cracks.

It is still a further object of this invention to provide an anchoring device which is simple in construction, inexpensive to produce and will allow the wall or ceiling to be readily dismantled when desired.

It is a still further object of this invention to provide an anchoring device which will enable the construction of a wall or ceiling possessing better constructional qualities with a considerable saving in time, labor, and cost.

Further and additional objects will appear from the descriptions, accompanying drawings, and appended claims.

In accordance with one embodiment of this invention, a clip for anchoring lath panels to supporting members is provided having a head portion adapted to embrace said supporting member. Extending from the supporting member in a transverse plane beyond the plane formed by the panels is a leg of the head portion. Extending from the leg and disposed in a plane substantially parallel to the plane of the panels is a bowed body portion. From the opposite end of the body portion and angularly disposed with reference thereto extends a hook or hasp portion which is adapted to interlock with the extended leg of an adjacent clip when in position. When positioning the clip the head portion is first caused to embrace the supporting member, the edge of the panel is then slipped between the supporting member and the clip and placed in an edge to edge relation with the adjacent panel, the head portion is then moved so as to cause the extended leg to contact the adjacent edge of the panel, and then the hasp portion is brought under tension, into engagement with the extended leg of the adjacent clip. When the hasp portion is in the interlocked position with the adjacent clip, the bowed body portion is deformed to a substantially straight line and resiliently contacts the adjacent face of the panel, and the supporting force of the clip is distributed across substantially the width of the panel.

For a more complete understanding of this invention reference should now be had to the drawings wherein Fig. 1 is a fragmentary view of a wall construction showing the lath panels and anchoring clips in place prior to the application of the plaster coat to said panels;

Fig. 2 is a fragmentary sectional view of a ceiling construction without the plaster coat applied;

Fig. 3 is a fragmentary front view of the anchoring clip shown in Figs. 1 and 2;

Fig. 4 is a fragmentary sectional view of the ceiling construction taken along line 4—4 of Fig. 2;

Fig. 5 is a fragmentary perspective view of the yoked head portion of the clip showing the manner of interlocking the hook portion of an adjacent clip and said head section;

Fig. 6 is a fragmentary perspective view of the yoked head portion and a portion of the body section of a modified anchoring clip;

Fig. 10 is a fragmentary perspective view of a wall construction with the upper panel removed so as to expose the head portion of a modified clip used where side attachment of the clip to the supporting member is desired;

Fig. 11 is a front elevational view of a modified clip;

Fig. 12 is a side elevational view of another modified clip;

Fig. 13 is a front elevational view of still another modified clip;

Fig. 14 is a side elevational view of another modified clip;

Fig. 15 is a fragmentary perspective view of the head portion of the modified clip of Fig. 14 showing the manner of interlocking the hook portion of an adjacent clip of like design with said head portion;

Fig. 16 is a fragmentary plan view of the head portion of a modified clip;

Fig. 17 is a fragmentary perspective view of the head portion shown in Fig. 16, and Fig. 18 is a perspective view of a starter clip.

Figure 1:
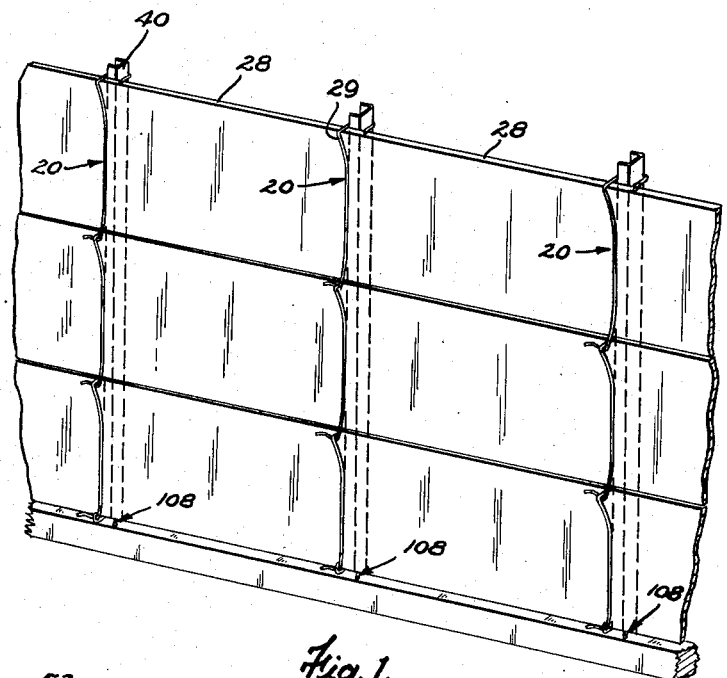

Referring now to the drawings and more particularly to Figs. 2 and 3, an anchoring clip 20 is provided having a yoked head portion 22 suitable for embracing a supporting member 24 in a transverse plane and having one leg 26 extending away from said supporting member beyond the plane formed by the lath panels 28. Disposed in a plane substantially parallel to the plane of the panels 28 is a bowed body portion 30, which is connected to the end of leg 26 by a connecting portion 29. The body section 30 is suitable, when in an operative position, to resiliently contact the adjacent face 32 of panels 28. Extending from and integral with body portion 30 and angularly disposed with reference thereto is a hook portion 34 which, when in an operative position, engages or rests against a surface 29' of the connecting portion 29 of an adjacent clip 38 and effects interlocking therewith. The surface 29' of the connecting portion 29 of the clip is spaced away from the exposed face 32 of the lath panel 28 a distance sufficient to permit the hook portion 34 of an adjacent clip to be slidably positioned between the panel 28 and the connecting portion 29, as shown in Fig. 2.

The head portion 22 in the form of the clip shown in Figs. 1, 2, and 3, is suitable for embracing channel studs 40, shown in Fig. 1, or channel ceiling joists 42 shown in Fig. 2. The embracing of the studs or joists by head portion 22 is such as to prevent rotation of the latter. The head portion 22 has a second leg 44 which is disposed in the same transverse plane of the head portion, as shown in Fig. 3, and curves inwardly toward the first mentioned leg 26 so as to positively embrace the supporting member 24. The end 46 of the leg 44 flares outward slightly so as to enable the operator to more readily cause the head portion to be brought into embracement with the supporting member 24.

The hook portion 34, mentioned above, which is angularly disposed and integral with the body portion 30, curves slightly upward in the center portion 47 as shown in Fig. 3, thereby restraining the hook portion 34 from becoming disengaged from the extended leg 36 of the adjacent clip when once in the interlocked position, regardless of the tension and strain caused from the added weight of the applied plaster. The end 48 of the hook portion 34 inclines outwardly slightly to facilitate engagement of the hook portion with the leg 36 of the adjacent cooperating clip. The manner of interlocking the hook portion 34 with the adjacent clip 38 is more clearly shown in Fig. 5.

A slightly modified clip 49 is shown in Fig. 6 wherein the connecting portion 50 interconnecting bowed body portion and the extended leg 26 of the head portion 22, is offset slightly from the plane of the panels (not shown) thereby enabling the operator to more readily cause the hook portion 34 of the adjacent clip to interlock therewith.

Figure 7:
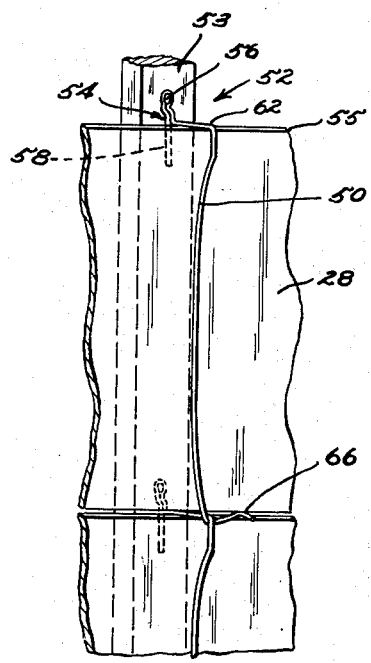
Fig. 7 is a fragmentary perspective view of a wall construction with the coat of plaster removed showing a modified clip used in anchoring panels to a wall supporting member.
Figure 9:
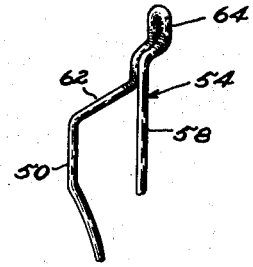
Fig. 9 is a fragmentary perspective view of the head portion of the anchoring clip shown in Figs. 7 and 8.
Figure 8:
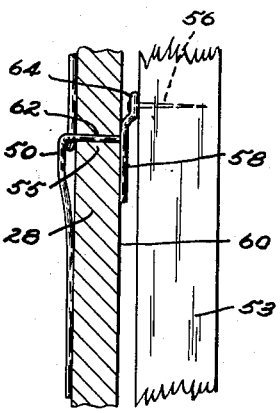
Fig. 8 is a fragmentary side elevational view of the wall construction shown in Fig. 7.

A modified clip 52 is shown in Figs. 7, 8, and 9 and is adapted for being used with a wooden supporting member 53. The principal modification of this clip 52 from that of clip 20, as described above, is in the head portion 54. Rather than embracing the supporting member 24, as shown in Figs. 1, 2, and 4, the head portion 54 is fastened by screw or nail 56 directly to the wooden supporting member 53. The head portion 54 embraces the edge 55 of the panel 28 so that one leg 58 is adjacent the outside face 60 of the panel and thus holds the panel in a spaced relationship with the wooden supporting member 53, as shown in Fig. 8. The other leg 62 extends transversely across the edge 55 of the panel beyond the plane of said panels to the body portion 50 which is similar to that described above for clip 49. The head portion 54 is provided with an eye section 64, as shown in Figs. 8 and 9, through which a nail or screw 56 passes so as to fasten and hold the clip 52 directly against the wooden supporting member 53. The body portion 50 and the hook portion 66 are the same as described above.

A slight modification is shown in Fig. 10 where in certain construction it might be more desirable to fasten the clip 68 to the side 70 of the wooden supporting member 53, which is at right angles to the plane of panel 28. In this instance, the head portion 71 has one leg 72 which extends substantially in a transverse direction and is offset 73, intermediate the panel 28 and the point of attachment 74 of the clip 68 to the supporting member 53. The offset 73 enables the panel 28 to yield to the slight movement of the wooden supporting member 53 and thereby materially reduces the possibility of cracks forming in the ceiling or wall. The body portion and hook portion, not shown in Fig. 10, are similar to those described above.

Various other modified forms of clips are shown in Figs. 11, 12, 13, 14, and 16. In Fig. 11 the head portion 22 and the hook portion 34 are the same as those for clip 20 described above. However, the body portion 76 differs from the body portion 50, shown in Fig. 9, in that there is a lateral offset section 78 intermediate the hook portion 34 and the head portion 22. When the clip is in position the lateral offset section 78 contacts the face of the panel and thereby prevents any turning of the clip in the direction A, as shown in Fig. 11.

In Fig. 12 another type of modified clip 79 is shown having a head portion 22 and a hook portion 34 which are similar to those for clip 20 but having a body portion 80 which has a plurality of transverse offsets 82, 84, and 86 which, when the clip is in the position, contact the face of the panel, thereby causing the sections 87 of the body portion intermediate the offsets 82, 84, and 86 to be spaced away from the face of the panel. With this type of clip, when a coat of plaster is applied, the plaster completely surrounds the intermediate sections 87, whereby the latter act as locking keys to hold the plaster more securely against the face of the panel.

The clip 88, shown in Fig. 13, has a modified bowed body portion 89, a modified head portion 90 and a loop-shaped hook portion 92. The body portion 89 has an offset or Z-shaped section 93, intermediate the head portion 90 and the hook portion 92, extending laterally in either direction. The offset section 93 prevents turning of the clip in either direction when it is being positioned. The head portion 90 and hook portion 92 are substantially L-shaped and U-shaped, respectively. The manner of positioning clip 88 is the reverse from that for positioning the other clips described and is as follows: The hook portion 92, which is U-shaped, is first brought into engagement with the extended leg 94 of the adjacent clip and then the head portion 90 is brought up into position so that the free end 96 of the head portion engages behind the supporting member and then is bent around so as to embrace the supporting member.

In the clip 97 shown in Fig. 14 the head portion 98 is similar to head portion 22 of clip 20 in that it embraces the supporting member in a transverse plane but its extended leg 100 is stepped, so that, when the panels are in erected position, the edges of the adjacent panels will be spaced apart to receive therein a portion of the coat of plaster which is subsequently applied to the panel face, thereby enhancing the keying of the plaster to the panel. The hook portion 102 also is offset slightly as shown in Figs. 14 and 15 and engages the upper step 104 of the leg 100 as shown in Fig. 15 so as to cause the adjacent clips to be aligned with one another.

Clip 105, shown in Figs. 16 and 17, has its head portion 106 normally disposed obliquely to the plane of the body portion 30. The head portion 106 is adapted to resiliently engage supporting members, of varying sizes, when the hook portion (not shown) is caused, under tension, to engage the adjacent clip.

Where metallic channel-type supporting members are used a starting clip 108 is required. The starting clip 108, as shown in Fig. 18, is adapted to embrace the supporting member (see Fig. 1) in a transverse plane and has one leg 110 of such length that, when the clip is applied, said leg extends beyond the plane of the panels, terminating in a loop 112, suitable for being engaged by the hook portion of the adjacent clip. The other leg 114 of the starting clip 108 also is of such length that it extends substantially beyond the plane of the panels and is kinked inwardly so as to resiliently engage the supporting member. The outer end 116 of leg 114 is outwardly inclined so as to facilitate engagement of the clip with the supporting member. The end portion 116 also serves as a handle for the operator to grasp when manipulating the clip into engagement with the supporting member. After erection, the handle portion 116 may be bent back against the surface of the board, or may be simply cut off. When wooden supporting members are used a starting clip is not required as a nail is sufficient, if it is driven directly into the supporting member at substantially a right angle thereto and has a shank long enough to extend beyond the plane of the panels, so as to be engaged by the hasp section of the adjacent clip.

The legs of all the head portions above described extend sufficiently beyond the plane of the panels for three reasons; namely, (1), to allow ready engagement by the hook portion of the adjacent clip; (2), to provide a ground, that is, to insure that a minimum thickness of plaster will be applied to the panel face; and (3), to enable the applied plaster to more readily surround the body portion of the clip so the latter will act as a key for the plaster to tie the same more securely to the lath panel.

Thus it will be seen that a clip method has been provided for anchoring lath panels and the like to supporting members, in a wall or ceiling construction which has a sufficient holding power to withstand the combined weights of the panel and the plaster applied thereto, and also provides greater bonding between the plaster and the panel. The panel supporting clips are so positively interlocked with each other that, irrespective of the weight exerted against the same, the adjoining ends of the clips will not become disengaged and the danger of a falling ceiling is completely eliminated. Moreover the curvature of the panel engaging portions of the clips is such that, when the clips are in operative position, they are deformed to a substantially straight line and exert a pressure toward the panels always tending to hold the latter in proper position against their supports. Also it will be seen that a clip has been provided which is simple in construction, reliable, inexpensive to produce, and which enables a wall or ceiling employing the same to be readily dismantled when desired.

While several embodiments of this invention are shown above, it will be understood, of course, that the invention is not to be limited thereto, since many modifications may be made and it is contemplated, therefore, by the appended claims to cover any such modifications as fall within the true spirit and scope of this invention. Thus the support-engaging head portions of the clips are disposed at substantially a right angle to the plane in which the body portion of the clip lies when in use. While this angle varies somewhat in the various forms of the clip and also depends upon whether it is considered unattached or considered when in panel-supporting position, the designation, in the claims, of "at substantially a right angle" is intended to comprehend these various relative positions of the head and body portions of the clips. Also while the entire support-engaging head portion of the clip is shown in Figs. 1, 2, 3, 4, 5 and 6 as being approximately at right angles to the axis of the panel-engaging body portion of the clip, it is not essential that the entire head portion be so disposed, but only the portion immediately adjacent the body portion, for the other elements of the head portion may be otherwise disposed, as for example, as shown in Figs. 7, 8, 9 and 10. Accordingly, the designation herein "at substantially a right angle" for the relative position of the head portion with respect to the axis of the body portion, is intended to comprehend various other relative positions of the remaining elements of the head portion other than that immediately adjacent the body portion, so long as the head portion, when in engagement with a support, is adapted to prevent rotation of the clip.

I claim:

1. A resilient clip for securing a lath panel to a support, said clip comprising an elongated body portion, a support-engaging head portion at one extremity of said clip and a hook portion at the opposite extremity of said clip, said head portion extending at substantially a right angle to the longitudinal axis of said body portion and adapted for nonrotatable connection with said support, said body portion being substantially arcuate in shape and the convex side of said body portion extending in the same direction as said head portion, a connecting portion joining said body portion and said head portion, said connecting portion including a hook-engaging surface, said surface and said head portion being disposed on the same side of said connecting portion, said surface being adapted to be spaced from the face of a lath panel a distance sufficient for the reception of the hook portion of an adjacent clip when said panel and clip are applied to the support, said hook portion extending at substantially a right angle to the longitudinal axis of said body portion and at substantially a right angle to the head portion, whereby said hook portion is adapted to engage the connecting portion of an adjacent clip and to be disposed between said surface of said connecting portion and the face of a lath panel, and the arcuate body portion of said clip is adapted to exert a continuing pressure on a face of the lath panel when said clip and panel are applied to the support.

2. A clip as set forth in claim 1 wherein said head portion is substantially U-shaped and the legs and bight of the U-shaped head portion are disposed in a plane at substantially a right angle to the longitudinal axis of said body portion, said U-shaped head portion being adapted to embrace the support.

NELS NELSSON.

References Cited in the file of this patent

UNITED STATES PATENTS

| Number | Name | Date |
|---|---|---|
| 883,434 | Waite | Mar. 31, 1908 |
| 1,761,323 | White | June 3, 1930 |
| 1,796,959 | Raynor | Mar. 17, 1931 |
| 1,803,632 | Makowski | May 5, 1931 |
| 1,874,802 | Raynor | Aug. 20, 1932 |
| 2,016,874 | Raynor | Oct. 8, 1935 |
| 2,151,904 | Eades | Mar. 28, 1939 |
| 2,164,464 | McNabb | July 4, 1939 |